(12) United States Patent
Irmler

(10) Patent No.: US 9,575,970 B2
(45) Date of Patent: Feb. 21, 2017

(54) SYSTEM FOR SYNCHRONIZING REMOTELY DELIVERED AUDIO WITH LIVE VISUAL COMPONENTS

(71) Applicant: Disney Enterprises, Inc., Burbank, CA (US)

(72) Inventor: Holger Irmler, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 315 days.

(21) Appl. No.: 13/936,769

(22) Filed: Jul. 8, 2013

(65) Prior Publication Data

US 2015/0012123 A1 Jan. 8, 2015

(51) Int. Cl.
*G06F 17/30* (2006.01)

(52) U.S. Cl.
CPC .................. *G06F 17/30044* (2013.01)

(58) Field of Classification Search
CPC  G06F 17/3074; G06F 17/30; G06F 17/30044; G06F 3/0484; G06F 3/0481; G10H 1/0075; G10H 2230/041; G10H 7/004
USPC .......... 700/94; 381/306; 707/736, 769, 770; 235/375; 709/217, 224, 246; 725/74
See application file for complete search history.

(56) References Cited

U.S. PATENT DOCUMENTS

| | | | | |
|---|---|---|---|---|
| 7,995,770 B1* | 8/2011 | Simon | .................... | H04R 3/005 381/77 |
| 8,505,054 B1* | 8/2013 | Kirley | .............................. | 725/74 |
| 2002/0107965 A1* | 8/2002 | Piccionelli | .................... | 709/225 |
| 2006/0250522 A1* | 11/2006 | Wood | ........................ | H04N 5/04 348/515 |
| 2013/0074137 A1* | 3/2013 | Taylor | ............................ | 725/97 |
| 2013/0291035 A1* | 10/2013 | Jarvis | .................... | H04L 65/602 725/109 |
| 2014/0068681 A1* | 3/2014 | Lemmey | .............. | H04N 21/242 725/74 |
| 2014/0258859 A1* | 9/2014 | Plumb | .................... | H04R 27/00 715/716 |

* cited by examiner

*Primary Examiner* — MD S Elahee
(74) *Attorney, Agent, or Firm* — Marsh Fischmann & Breyfogle LLP; Kent A. Lembke

(57) ABSTRACT

A method and system are provided to synchronize an audio program output at a location remote to a site of a visual display such as a fireworks show, a water and light show, or other event or show with a large visual display visible from distances over which the originally sourced audio is delayed, degraded in quality, or lost. The method includes providing a live show including a visual display with components triggered by one or more control signals. The method further includes concurrently providing an audio output that may include playback of a soundtrack associated with the visual display with a sound system of a mobile device. The audio output is provided at a location that is remote from the site of the visual display, and the audio output is synchronized in time with the components of the visual display using the control signals or a preset start time.

18 Claims, 3 Drawing Sheets

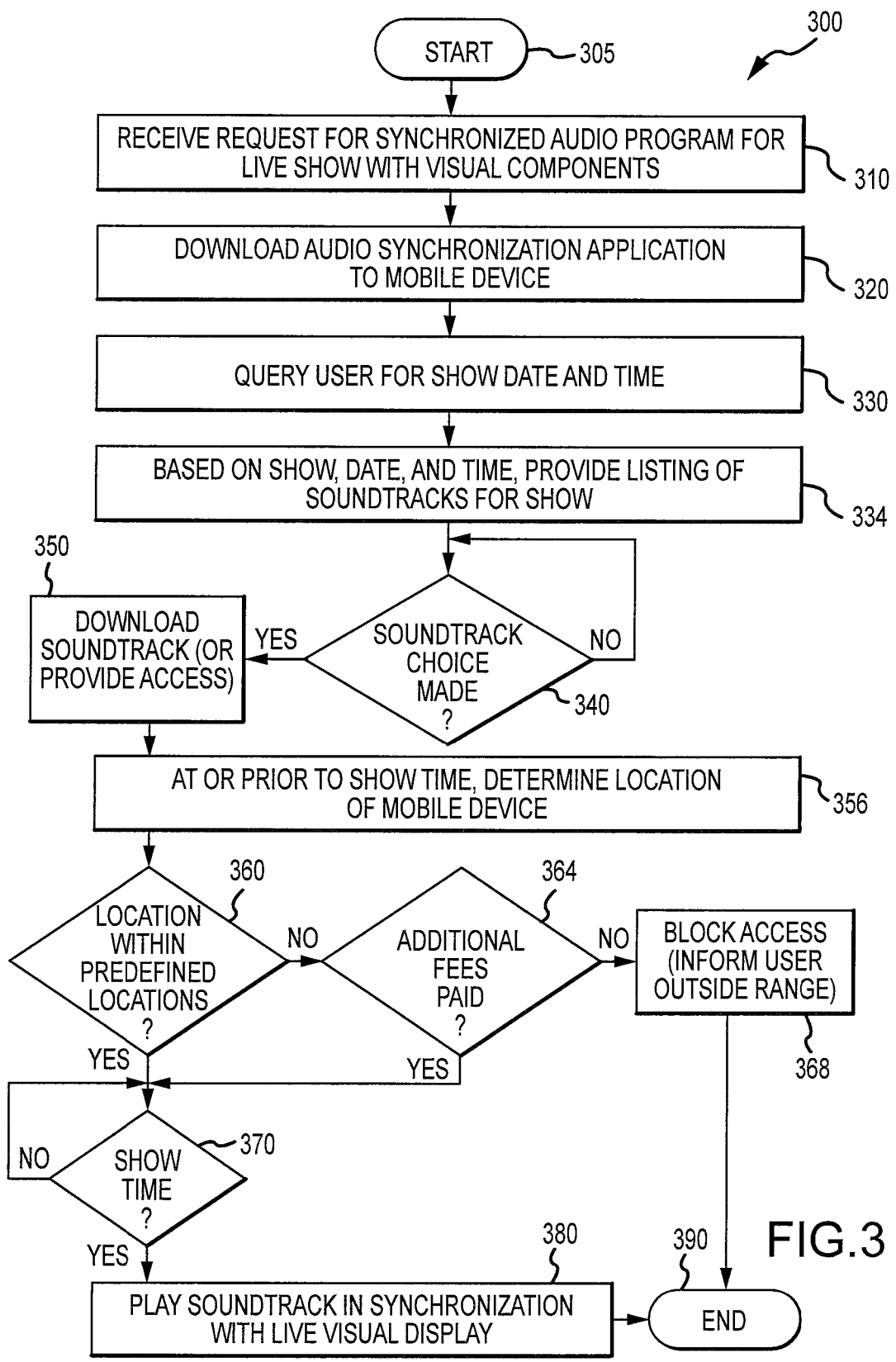

SYSTEM FOR SYNCHRONIZING REMOTELY DELIVERED AUDIO WITH LIVE VISUAL COMPONENTS

BACKGROUND

1. Field of the Description

The present description relates, in general, to methods and systems for providing visual displays and live events in outdoor settings or venues, and, more particularly, to methods and systems for enhancing a viewer's appreciation or experience of a live event with visual components, such as a firework display or a water show, when the viewer is at a location remote to the visual components (e.g., a "remote viewing location").

2. Relevant Background

There are many settings where entertainment is provided in an outdoor setting or venue, and the entertainment combines a large visual display made up of numerous components (or "visual components") with an audio soundtrack (or "audio components"). For example, a fireworks display or show is a display of the effects created by numerous firework devices, and the triggering of the firework devices may be synchronized with an appropriate soundtrack of themed music or sound effects. In the United States, firework displays are often provided to celebrate Independence Day, and a soundtrack of patriotically themed music is played during the fireworks display with certain effects timed to or synchronized with the playing of certain songs or portions of the soundtrack (e.g., "rockets' red glare" timed with fireworks that create large red streaks or plumes and so on).

As another example, large fountain-based shows often combine spraying water, which may be selectively illuminated to provide water and light-based visual components, with the playing of a soundtrack. The music or sound effects provided may be synchronized to the triggering of operation of the fountains, e.g., softer or slower music when the fountains are providing fewer and/or smaller streams and louder and/or faster tempo music when the fountains are providing many and/or larger streams of water. Light and/or laser shows are also used to entertain audiences in outdoor settings, and these shows typically combine visual effects with a soundtrack suited to and timed with the visual effects to create an exciting and/or appealing experience for the audience members. Outdoor entertainment may also include providing a movie on a large outdoor screen and using nearby speakers to provide the corresponding and time-synchronized audio components (e.g., actors' dialog, music, and sound effects).

There are many settings where it is desirable to provide entertainment that combines large visual effects or components with audio effects or components. These settings include theme parks, sports stadiums, street fairs, and holiday celebrations in parks, on city streets, and other outdoor environments. While popular, outdoor entertainment that combines visual and audio components can typically only be fully enjoyed by members of an audience located a finite and relatively small distance from the source of the audio components. When the entertainment or show is experienced from too great a distance, the soundtrack or audio components are no longer properly synchronized or timed (as desired by the show's director or as intended) with the visual components.

Because sound travels much more slowly than light, the visual components reach a viewer of the show located at a remote location very quickly (or nearly instantaneously) while there is delay or lag before the corresponding audio components are perceived. The "remote" viewers or audience members may be only a few city blocks away before the visual-to-audio synchronization is lost and/or before the sound simply loses its quality (e.g., becomes distorted or is too soft to be properly enjoyed).

Hence, there remains a need for methods and systems that allow a person at a remote location to enjoy a live show (e.g., an outdoor show or entertainment event) that includes visual components and audio components.

SUMMARY

The inventor recognized that visitors of theme parks and other facilities enjoy fireworks shows, water shows, light shows, and other outdoor entertainment that typically combines a large visual display with a soundtrack or audio program. Many of the visitors, though, are not able to be close enough to the show location (or location of the audio system) to appreciate the full experience as the sound dissipates or lags in time. This can be frustrating for these visitors, such as guests of nearby resort hotels, because they can often see and enjoy the visual display and its components from significant distances, e.g., from a balcony or rooftop of a hotel, street corner, an open field or park, or a parking lot that may be blocks or even miles away from the source of the visual display.

With this issue in mind, the inventor determined that there would be a great demand and many applications for providing distant viewing of large visual displays such as firework shows when the music, soundtrack, or audio program is synchronized with the visual components of the display (for which there is no appreciable lag even over large distances). Briefly, a method (and corresponding display system) is taught that facilitates performing a live event made up of visual and audible (or audio) components. The method includes conducting a live event with both visual components and locally-provided audio components to a local audience within hearing range of the event (or the show's sound system). The method also may include providing remote audience members a recorded soundtrack containing audio components matching those provided to the local audience via the local sound system.

The method further includes the remote audience members operating a remote audio system (e.g., a wireless client device such as a mobile phone or similar device) to play the recorded soundtrack in a manner that is time synchronized with the performance of the visual components at the remote location. The remote audience members are within the visual range of the live event and its visual display but are, typically, outside a practical audible range of the live event and its audio output. The method may include, while conducting the live event, transmitting one or more trigger signals (e.g., Society of Motion Picture and Television Engineers (SMPTE) timecode-based signals often used to synchronize music to a visual display) to the remote audience members' remote audio systems to initiate playback of the audio components of the recorded soundtrack so as to be in synchronization with the visual components of the live event.

The method may also involve determining a present location of the audience member (i.e., of the remote or portable audio system or client device the audience member is using) and, based on the location, allowing or blocking (or otherwise controlling) the playback of the soundtrack. For example, a provider of a live event may selectively allow audience members to listen to a synchronized soundtrack while viewing a show from a set of pre-defined locations while concurrently blocking other audience members from listening to the synchronized soundtrack when they are determined to be viewing the show from a location outside the set of pre-defined locations. In other cases, the audience members at the locations outside the set of pre-defined locations may simply be charged a higher rate or purchase price to obtain access to the synchronized soundtrack and/or its timely playback with the live visual display. This allows the system operator to provide location-based control over access to the synchronized soundtrack such as to allow guests of particular resorts to enjoy the show remotely while limiting access to those nearby who are not on the resort property.

More particularly, a method is provided for presenting audio programming in synchronization with a visual event. The method includes presenting a visual display at a first location, and, often, one or more visual components are triggered by control signals during the presenting. The method further includes, in synchronization with the presenting of the visual display, providing local audio output from an audio system positioned at or proximate to the first location. The method also includes, concurrently with the presenting of the visual display, providing, with a client device at a second location, an audio program that is time synchronized with the one or more visual components of the visual display.

In some implementations of the method, the visual components of the visual display are perceivable by an audience member at the second location, and the local audio output is delayed causing loss of the synchronization with the visual display (and/or is at a volume or decibel level that is unacceptably low for audience participation or appreciation or is otherwise degraded in quality). In the method, the time synchronized audio program may be played beginning at a time corresponding with a start time for the visual display at the first location. In other implementations, the audio program is synchronized to the visual components using the control signals used to trigger the visual components. In these implementations, the audio program may be stored in memory on the client device prior to the providing of the audio program, can then be played back upon a receipt of a first one of the control signals, and may be modified to correct for delays in receipt of one or more of the control signals to provide time synchronization with the presenting of the visual display at the first location.

In some cases, the audio program provided at the second location is substantially similar in content to the local audio output. However, in other cases, the audio program differs in content from the local audio output and wherein the audio program content is selected from a set of soundtracks based on user input on the client device (e.g., the user may choose a soundtrack to hear music of a particular genre (such as country or rock music) or theme (such as for a holiday)). The method may also include steps of controlling access to the audio program based on location of the mobile or client device. In such cases, the method may include, prior to the providing of the audio program, determining a geographic location of the client device and then performing the providing of the audio program step only when the geographic location is determined to be in a set of predefined locations (or when the user of the client device provides a fee for watching and listening to the live show at a location outside a preapproved "free listening" zone).

BRIEF DESCRIPTION OF THE DRAWINGS

FIG. 3 is a flow diagram of an exemplary method of providing an audio playback of a soundtrack or sound file that is time synchronized with a live show and its visual display components.

DETAILED DESCRIPTION

The present description is directed toward methods and systems for providing an audio program or output on an audio system (or audio output device) that is remote to the presentation of a visual display. Remote in this description typically means any distance that is considered outside a defined audible range for a particular local audio system operating in synchronization with the visual display. The visual display may, for example, be a water show with fountains and lighting, may be a laser or light show, may be a fireworks show, or may be another display that may include visual components that are visible from significant distances such as several hundred yards up to several miles.

The methods and systems are adapted to synchronize the operation of the audio system to play the audio program such that it is time synchronized with the components of the visual display. For example, the remote playback may be synchronized to the same degree or in the same manner as a soundtrack output by the local audio system is synchronized to the visual display (e.g., the remotely played and locally played soundtracks may be started at a predefined time (with the actual triggering varying among remote devices somewhat based on the method of determining the predefined time)).

Figure 1:
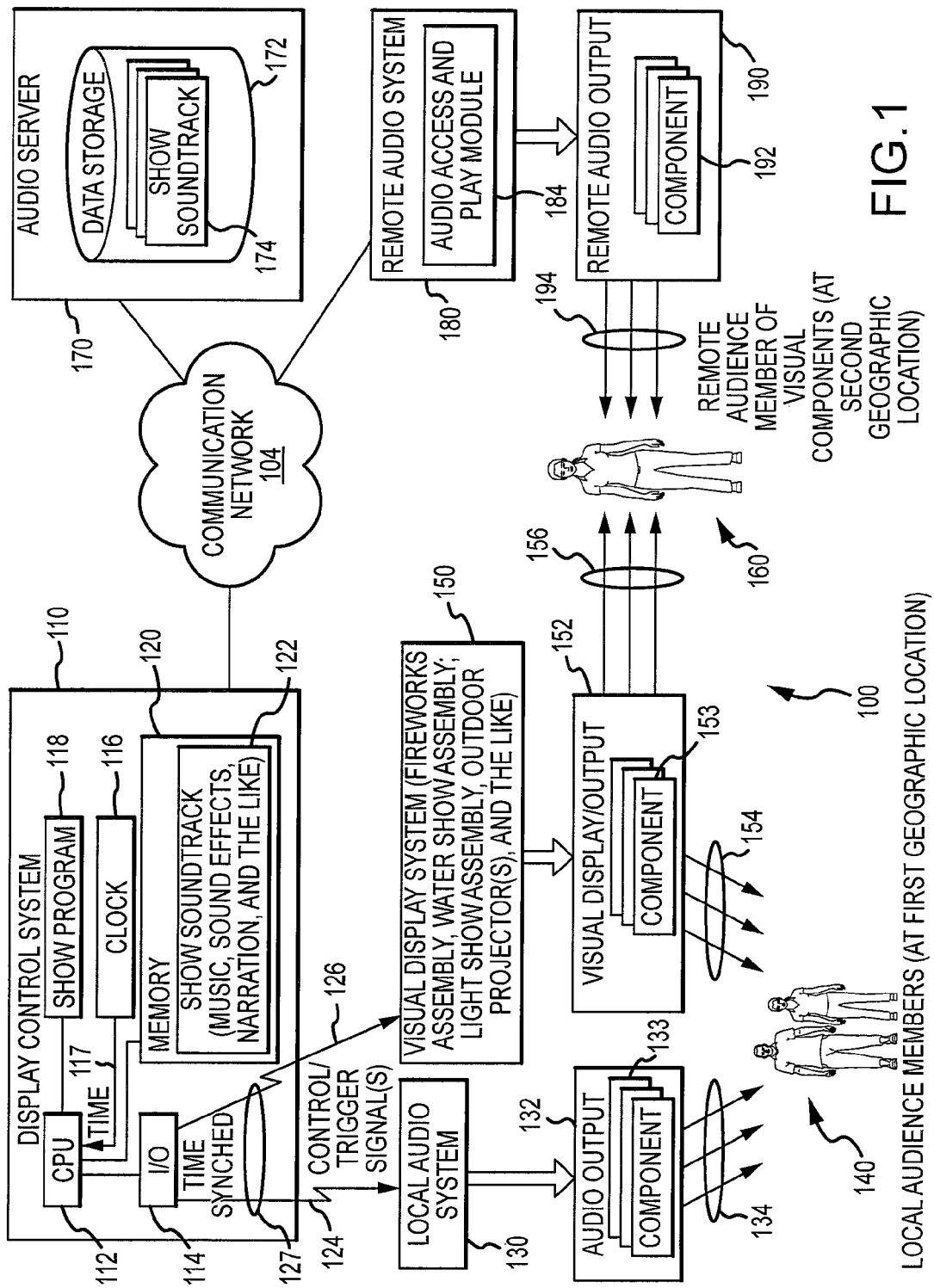
FIG. 1 illustrates a display system adapted for synchronizing audio components or output with live visual components when the audio components or output (e.g., a soundtrack for a show) are output at a location that is geographically remote or distant from the visual components (e.g., a fireworks display)

FIG. 1 illustrates a functional block diagram of a display system 100 that is adapted to provide such time-based synchronization of an audio output (e.g., providing a soundtrack of a show) at a location that is "remote" to a visual display or output. Again, "remote" may vary widely to practice the system 100 and may vary with a particular audio system and its limitations or settings (e.g., one sound system may be able to provide sound to an audience that is a few hundred yards away while others may only be able to provide sound to an audience with a much smaller radius such as less than 50 yards). Therefore, "remote" is generally defined as outside an audible range of a local audio system (such as system 130 in display system 100 of FIG. 1), but, generally, it may be any distance greater than about 50 yards.

The display system 100 includes a display control system 110 that includes a processor 112 that operates (such as with an operating system) to execute or run code or programming to perform a number of functions. Particularly, a show program 118 (e.g., executable code stored in computer readable media or memory) is run by the processor 112 to cause it to generate control signals 124 and 126 to a local audio system 130 and to a visual display system 150. These trigger or control signals 124, 126 are time synchronized as shown at 127, and the control system 110 may utilize a clock 116 to provide a time signal or data 117 to initiate the control signals 124, 126 at one or more particular and preset times (such as times set by the show program 118). In other cases, an operator of the control system 110 may input a "start" or "go" command to start a show that triggers the processor 112 to run the show program 118, which results in the control signals 124, 126 being issued in a time-synchronized manner as shown at 127.

The display control system 110 includes input/output (I/O) devices 114 such as a keyboard, a mouse, a touchscreen/pad, a voice recognition mechanism, and the like that allow an operator (not shown) to select a show program 118 to run, to choose a soundtrack 122 to play with the operation of the visual display system 150, and/or to trigger start of the show program 118 (or to set a start time in the show program such as via a user interface provided on a monitor provided in the I/O devices 114). The I/O devices 114 further may include transceivers for transmitting the signals 124, 126 in a wired or wireless manner to the local audio system 130 and to the visual display system 150 (and, in some cases, for transmitting "start" signals to the remote audio system 180 via a digital communication system 104 such as the Internet or the like).

As shown, the display control system 110 includes memory 120 (or may have access such as via network 104 to remote data storage) that stores a show soundtrack 122. The show program 118 may be configured to define a start time for the playing of the show soundtrack 122 (or times for its components 133), which may include music, sound effects, narration, and other audible/audio components that are selected to suit a particular visual display/output 152. The show program 118 may define when the audio control signals 124 are transmitted to the local audio system 130, and the control signals 130 may include the soundtrack 122 or portions thereof while in many implementations the local audio system 130 will include memory (not shown) storing a copy of the show soundtrack 122 for playback upon receipt of a control signal (or show start signal) 124. The local audio system 130 responds to such a control signal 130 to output an audio program or audio output 132 with a number of audible components 133 that can be perceived as shown at 134 by members of a local audience 140, which are located at a first geographic location such as within a theme or other park or at a sports stadium.

The show program 118 also is designed to control operation of the visual display system 150 by issuance of the control or trigger signals 126. The visual display system 150 responds to the signals 126 by outputting a visual display or output 152 with visual components 153 that can be viewed by or are visible to the members of the local audience 140, and, typically, the audio output 132 and the visual display/output 152 includes at least some components 133, 153 that are time synchronized for concurrent perception 134, 154 by the members of the local audience 140 (such as playing a particular song or portions of a song when generating a particular visual effect).

The visual display system 150 may be a fireworks assembly 150 that may have a predefined number of components 153 that are triggered sequentially upon receipt of the control or start/trigger signal 126 and a soundtrack 122 may be played by the local audio system 130 with the firework display 152. In other cases, the visual display system 150 may be a water show assembly with fountains and lighting to provide the visual display 152 and its components 153 and the audio output 132 again may be a soundtrack with one or more songs synchronized to the visual display 150. Other visual display systems 150 may be used to provide an outdoor light show, to display a movie, or nearly any other visual display/output that can be viewed by the local audience members 140 as shown at 154 with a concurrently provided audio output 132 as shown at 134.

As shown in FIG. 1, a remote audience member 160 may also be able to view as shown at 156 the visual display output 152 and its visual components 153. However, the remote audience member 160 is at a second geographic location that is remote from the local audio system 130 such that they cannot perceive 134 the audio output 132 and its components 133 that are synchronized with visual components 153 (or the sound 134 is of such a lower quality as to be undesirable such as due to a significant time lag and/or reduction in volume).

With this issue in mind, the display system 100 is shown to include a remote audio system 180 that is operable to generate remote audio output 190 with audible components 192 that are heard or perceived as shown at 194 by the remote audience member 160. Particularly, the remote audio output components 192 are synchronized in time with the components 153 of the visual display output 152 (that are perceived or viewed as shown at 156 by the remote audience member 160).

In a simple example, the show soundtrack 122 may be transferred over the communication network 104 prior to the start of a show program 118 or during the show performance and then the audio access and play module 184 may function to cause the audio system 180 to playback the soundtrack with synchronization to the visual display/output 152 by the visual display system. In this example, the remote audible components 192 match the audible components 133 of the local audio output 132. In other cases, an audio server 170 may be provided in the display system 100 that has data storage 172 storing a number of show soundtracks (or audio programs) 174, and the audio access and play module 184 operates to retrieve (before or during the show performance by the control system 118 and visual display system 150) a show soundtrack 174 for use (e.g., playback) in providing the remote audio output 190.

The soundtrack or sound file 174 retrieved or obtained by the audio access and play module 184 may match the show soundtrack 122 used to generate the local audio output 132 or may differ. For example, the remote audience member 160 may be provided the option via the audio access and play module 184 to select among a plurality of soundtracks/audio programs 174 that are each adapted for synchronized playback with the generation of the visual display with its components 153 by the visual display system 150. This may include selection of a soundtrack to suit the age of the audience member 160, to suit the musical taste of the audience member 160, or the like. In other cases, the show soundtrack 122 may be a musical soundtrack while the soundtrack 174 obtained by the remote audience member 160 via the audio access and play module 184 over the network 104 may be or include narration or dialog (e.g., a commentary track provided by the creator of the visual display or show explaining the effects/components 153 to allow a remote audience member 160 who may have seen the display before to learn more about the live show and its creation).

As shown with FIG. 1, a display system 100 can readily be adapted for providing audio output 190 to a remote viewer 160 of a live visual display 152, with the audio output time synchronized to the display 152 and operation of the visual display system 150. The remote audio system 180 may take many, many forms to practice the system 100. For example, a system 180 may be provided that is Internet-enabled, with wired or wireless communication links to the network 104, so that the audio access and play module 184 may access the audio server 170 to obtain one or more of the show soundtracks or audio programs 174 for playing via one or more speakers (which may be built into the same housing or device as the processor/memory used to provide the module 184 or may be remote from this housing or device via wired or wireless communications/signals). In such cases, multiple audience members 160 may be served by one audio system 180.

Figure 2:
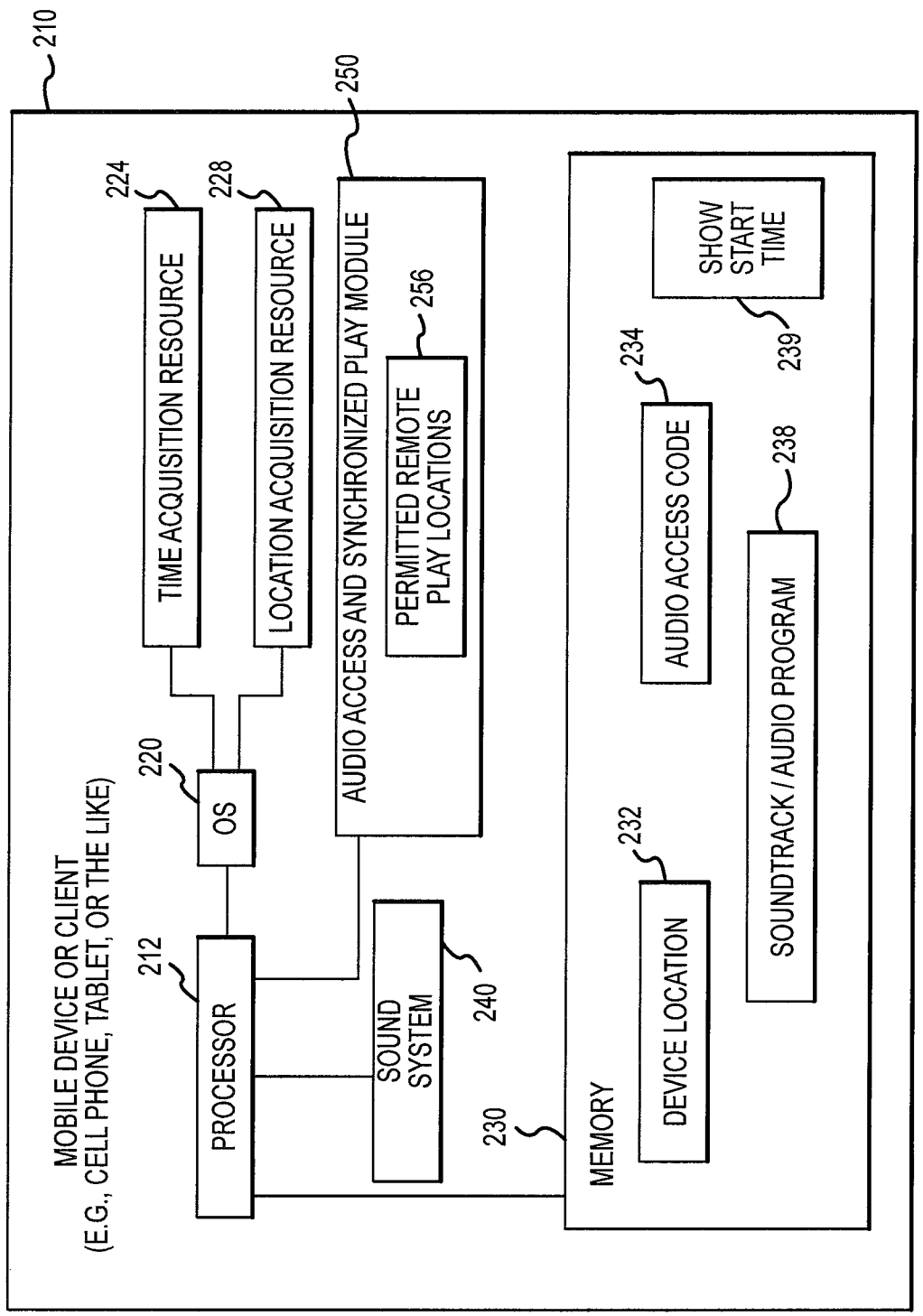
FIG. 2 illustrates a functional block drawing of a mobile device such as a cellular telephone, a smartphone, wireless tablet, or the like that is configured for use in providing audio output that is synchronized with a remotely provided visual display.

However, in other cases, it may be desirable for each audience member (or a small number of members) 160 to utilize a portable or mobile device or client. In this regard, FIG. 2 illustrates a mobile device or client 210 that may be used in a display system of the present description, such as to provide the remote audio system 180 of system 100 of FIG. 1. For example, the mobile device 210 may take the form of nearly any electronic device adapted for communicating with a source of show soundtracks or audio programming and components providing permission to access such audio programming and providing synchronization data (such as a "start" signal or an anticipated/planned time for issuing a visual display start signal such as a signal 126 as shown in FIG. 1). The device 210 also is adapted for playing (and, often, storing) a soundtrack or audio program. The mobile device 210 may be a client such as a computer pad, tablet, notebook, or a desktop computer. In other cases, the mobile device 210 takes the form of a cellular telephone such as a smartphone adapted for communicating over or accessing a digital network such as the Internet. This allows the mobile device 210 to obtain an application or "app" for accessing, retrieving, and playing a soundtrack or audio program in a time synchronized manner with a live visual display.

In FIG. 2, the mobile device 210 is shown to include a processor 212 running an operating system 220. The mobile device 210 may include time acquisition resources 224 such as an onboard clock or applications that query a remote service to obtain an accurate time based on the present location of the device 210 (e.g., adjust for varying time zones), and the time data may be provided to the operating system 220 such that applications running on the mobile device 210 can request and use the present time (such as module 250 to determine when to start playing a soundtrack or audio program 238). The mobile device 210 also includes location acquisition resources 228 such as a GPS chip, an accelerometer, and other devices whose combined operation is used to provide a geographical (or 3D) position of the mobile device 210 to the operating system 220, and applications such as the module 250 running on the device 210 may query the operating system 220 to obtain the present location of the device 210 and/or the device location 232 may be stored by the processor in memory 230.

The mobile device 210 further includes memory 230 that is optionally shown to store the present device location 232. The memory 230 is also used to store an audio access code 234 and a soundtrack or audio program (or sound file) 238 that is associated with a visual display to be provided live at a predefined location, which may be distal to or remote from the device location 232. The mobile device 210 includes a sound system 240 that may be used by an audio access and synchronized play module (or other playback programs or apps) 250 to provide audio output with audible components when the soundtrack or audio program is played.

During typical use of the mobile device or client 210, a user or operator (e.g., a remote audience member) will operate the mobile device 210 to download the audio access and synchronized play module 250 (or synchronized playback app). As part of this download or at a later time, the operator of the mobile device 210 may access a website or the like to purchase or obtain an audio access code 234 indicating the mobile device 210 or its user is authorized to access and listen to the playback of a soundtrack or audio program 238. The module 250 may be configured to verify the audio access code 234 is present prior to playing the soundtrack or the access code 234 may define one or more locations where the mobile device 210 is allowed or enabled to play the soundtrack. In this latter case, the module 250 may compare the device location 232 with the locations associated with the audio access code 234 to determine whether the soundtrack 238 is to be played concurrently with a remote visual display.

The soundtrack or audio program 238 is associated with a particular visual display (or outdoor show or event with such a visual display), and, by selecting this show or visual display, the user may initiate downloading of a recording of the soundtrack or program 238 onto their device 210. Alternatively, the memory 230 may be used to buffer portions of the soundtrack 238 that is fed in a live manner or nearly live manner (e.g., during performance of the show with the live visual display). The user may also be able to select the soundtrack or audio program 238 from two or more soundtracks or audio programs associated with the show to obtain a sound file that differs from that used to deliver audible components to the local audience members (such as music of a different genre or theme or a soundtrack providing narration of the show rather than or in addition to the music or sound effects).

The audio access and synchronized play module 250 is shown to define (or obtain from memory 230 or remote memory via queries to a server or the like) a set of permitted remote play locations 256. For example, synchronized playing of the soundtrack 238 with a live visual display may be allowed upon the balconies, rooftop, and grounds of a set of one or more resorts that are nearby a location of a live show (e.g., nearby a theme park where a fireworks, water, or light show is being provided). During operation, the module 250 will then determine whether the device location 232 is within the permitted remote play locations (person carrying the cell phone 210 is on a particular hotel grounds) or whether the mobile device is outside the permitted spaces or locations 256 (the cell phone 210 is being carried by someone who can view the display (or not) but that is not at a permitted location such as a resort that is a competitor to the resorts in the permitted remote play locations). If within the play locations 256, the module 250 may act to trigger play of the soundtrack or audio program (or sound file) 238 in a manner that it is synchronized with the timing of the providing of a corresponding live visual display or output or with portions or components of such a display (e.g., with components 153 of the visual display 152 provided by the operation of the visual display system 150 in the display system 100 of FIG. 1).

The audio access and synchronized play module 250 may act to synchronize the playing of the soundtrack or audio program with a live visual display in a number of ways. First, the module 250 may be provided and store a show start time (as shown in memory 230 at 239), and the module 250 may query the OS 220 to obtain a present time. When the present time matches that of the start time 239, the module 250 can trigger operation of playback of the soundtrack 238 with the sound system 240 (which may include a digital media player and speakers and/or a jack for earbuds/headphones or other exterior audio output devices).

In other cases, the mobile device 210 may query the display control system or other component of a display system (such as a show provider's server) to obtain a start time, and when the start time occurs, the module 250 may act to trigger playback of the soundtrack 238 with the sound system 240. In yet other cases, the control system 110 operates to transmit a start or go signal to each module 250 (e.g., that subscribe for such messaging) over a digital network or otherwise (such as communications network 104) on a plurality of mobile devices 210. Then, each module 250 can act to trigger playback of the soundtrack based on this absolute or actual start time of the show and providing of the visual display and its components by operation of a visual display system. In the latter two cases, the module 250 may further be configured to jump, synchronize, and/or shift to a point in the soundtrack or audio program so as to be synchronized in time with the actual start time and not merely with the time when the signal was received (so as to account for delays involved in receiving the start/go signal over a communications network and then processing the signal by the module 250 prior to starting playback).

In many cases, the soundtrack 238 is stored before the visual display is started to avoid issues with a delay in receiving a concurrent or live feed of the soundtrack at the mobile device 210. In other cases, though, the module 250 acts to determine the mobile device 210 has a location 232 (such as via GPS and so on in resources 228) corresponding with the permitted remote play locations 256 and, optionally, has an audio access code 234 corresponding with such locations 256 or with a smaller subset of such locations 256. When this is true, the module 250 acts to request the soundtrack or audio program 238 from the control system or another source on a network. The module 250 then acts to playback the soundtrack 238 as it is received. Buffering may be used at the mobile device 210 with or without readjusting the playback to better synchronize the local audio with the live visual display components (e.g., skip portions of the sound file and/or quicken the tempo of the playback to catch up and so on).

At this point, it may be useful to more generally discuss the method of providing an audio program (e.g., playing of a soundtrack, a sound file, or the like) with time synchronization with a live show with visual display components (e.g., a fireworks show, a water display, an outdoor movie, or other outdoor or large facility visual spectacular or entertainment). This method may be implemented by the operation of the system 100 of FIG. 1 and/or the use of the mobile device 210 of FIG. 2 or via other systems and components which will be understood by those skilled in the art based on their understanding of FIGS. 1 and 2 and the corresponding descriptions.

FIG. 3 illustrates a method 300 for providing, to a remote audience member, an audio program that is synchronized with a live visual display (or at least some of its visual components visible to the audience member at a remote location relative to the visual display source/system). The method 300 starts at 305 such as with a provider of a show made up of visual and audio elements deciding to allow people who can view the visual portions from remote locations (such as balconies or roofs of nearby buildings or in parks blocks away from the visual source) to also be able to enjoy audio that corresponds to the visual display. The show provider may design and create one-to-many soundtracks or audio programs that are suited for the performance of the show and enhance the experience of the visual display. For example, the show provider may create a visual display (such as with firework components, with water/light components, with laser displays, and so on) and then create a set of soundtracks suited for this visual display. The soundtracks may include: music/songs for one or more age groups or belonging to differing musical genres; music/songs suited for the visual display at any time of year and also suited for the visual display during certain holidays or celebration times of the year; narration with or without musical tracks describing the show or providing other information suited to the show; and sound effects with or without musical content.

Step 305 of the method 300 may include providing a server on a communications network that can be accessed by mobile devices or by applications running on such mobile devices. Particularly, step 305 may include providing a website or the like that can be accessed to obtain a downloadable application for the mobile device that controls or provides access to the soundtracks on the server and that acts to synchronize playback of any of the soundtracks with a live show's visual display (or visual components of such a live show). Such an application may be provided free (such as to guests of one or more resorts/hotels) or may be provided upon payment of a fee (such as at a first rate to guests of a theme park resorts and at a second higher rate to people who are not guests of the theme park resort and so on).

The method 300 continues at 310 with receiving a request for a synchronized audio program for a live show with visual components. For example, someone may operate their client device (such as, but not limited to, a mobile device such as a smartphone, tablet, or pad) to access a digital communications network and visit the show provider's or their representative's website to place a request for synchronized music for an upcoming live show (e.g., a fireworks or light show). In response (and, in some cases, after payment of a fee and/or verification that the requester is a guest of a particular resort or hotel or otherwise permitted access), at 320, the method 300 continues with downloading an audio synchronization application to the mobile device, e.g., over the same or a different communications network. For example, this may involve providing the module 184 on the remote audio system 180 in system 100 of FIG. 1 or providing the module 250 on the mobile device 210 of FIG. 2.

After this downloading process and/or as part of an application initiation process, the method 300 may continue at 330 with the downloaded application (or the website communicating with the application) acting to query the user of the mobile device for a show date and time for which they are requesting the synchronized audio program. For example, visual displays may be provided one or more times per night on an ongoing basis (the same or differing shows with the same or differing visual displays), and the synchronized audio program may be provided for a particular one or more of these shows that can be chosen by the user (e.g., the 10 pm show on Saturday or the like).

Then, at 334, the method 300 may continue with providing the user (e.g., via a GUI on the mobile device provided by the downloaded application) a listing of soundtracks available for delivery with the live show by the downloaded application. This listing typically would correspond with the one or more soundtracks created and stored on a network server at step 305 of the method 300. The listing may include special soundtracks only available at particular times of the year (e.g., during holidays). Further, the listing may be updated further to reflect information about the user. For example, the user may be a guest of a particular resort or hotel, and one or more soundtracks may be included in the listing that are only available to guests of this resort/hotel such as music chosen to match the theme of the resort or hotel. In other cases, the user may be determined to be a VIP guest or be celebrating a birthday or other special day, and the listing of soundtracks may include one or more soundtracks only made available to this subset of requesters/users of the downloadable synchronization application.

Step 340 is repeated to determine whether or not a choice is made for a soundtrack. If not, step 340 may be repeated for a certain period of time and then, upon this time period lapsing, a default soundtrack may be chosen for the requester at 340 (e.g., choose the soundtrack that is being used to provide audio output to a local audience at the locale of the live visual display). The method 300 continues at 350 with downloading of the chosen or default soundtrack to the mobile device (or another designated receiving device or remote sound system). In some cases, though, the soundtrack is made available on a network device for later retrieval and playback by the synchronization application.

At 356, the method 300 continues with determining the location of the mobile device. This location determination may be made at or immediately before a show (e.g., within about 5 minutes prior to a predefined show time or show start time, which may be updated by the show provider as live shows may have variable start times). Such "geo-sensing" may involve the downloaded application using the GPS and/or other location acquisition services of the mobile device to determine the geographic location of the mobile device, and the control technique is used to allow or not allow playback of synchronized audio programs depending on where the audience member is or, more accurately, where they have positioned their mobile device. Then, at 360, the method 300 may include determining whether or not the present mobile device location is within a set of predefined acceptable locations for watching and listening to the live show (e.g., is the mobile device on a particular resort's grounds, is the mobile device on ground's or in geographic areas specifically defined as not being allowed to receive the synchronization service such as on grounds of a competing resort, and so on).

If not, the method 300 may include at 364 a request for the user of the mobile device to pay additional fees to listen to the soundtrack at their present location. For example, the downloaded application may determine that the mobile device is presently off the grounds of a resort for which the synchronized audio program is provided free (or at a lower rate) to guests. But, the show provider may allow guests of the resort or others not on the resort's grounds to view the display with synchronized sound if these remote audience members first pay an "off-site" or higher fee. If the fee is not paid—or no such higher rate arrangement is offered in the method 300, the method 300 may continue at 368 with the downloaded application blocking access to the selected soundtrack. In step 368, the mobile device application may operate to inform the user via a GUI or alarm that the mobile device is outside of a permitted geographic area and may urge them to return to one of the predefined locations where listening is permitted (or may use GPS services of the mobile device to select a closest viewing and concurrent listening location for the particular live show, which may or may not be a resort at which they are a guest). The method 300 then may end at 390.

If the mobile device is determined to be within the predefined locations at 360 or an additional fee or access is obtained at 364, the method 300 continues at 370 with the synchronization application on the mobile device acting to monitor the time relative to the predefined show time. Step 370 is repeated until the show time occurs. In some embodiments, a clock in the mobile device or time provided by GPS signals/data may be used to determine the present time. In other cases, the server associated with the show controller is used to provide the present time. In still other cases, the show controller (or another show-related server device) acts to trigger playback of audio at the mobile devices such as upon a show start/go trigger being issued by the show controller (or an operator of the show controller "pressing" a start button/trigger to initiate a live show).

The method 300 continues at 380 once show time occurs with the playing of the selected (and, typically, downloaded/stored) soundtrack. Step 380 is performed such that the soundtrack is synchronized in time with the performance of the live visual display and its components or with operation of the visual display system to provide visual display output or components. The method 300 then ends at 390 after completion of the show and playback of the soundtrack (or upon cancellation by a user of the mobile device).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method for presenting audio programming in synchronization with a visual event, comprising:
   with a visual display system, presenting a visual display at a first location, wherein one or more visual components are triggered by control signals during the presenting;
   in synchronization with the presenting of the visual display, providing first audio output from an audio system positioned at or proximate to the first location; and
   concurrently with the presenting of the visual display, providing, with a client device at a second location, an audio program including second audio output that is time synchronized with the one or more visual components of the visual display concurrently presented at the first location,
   wherein the second audio output and the one or more visual components of the visual display are time synchronized without substantially delaying, after the time synchronization, the presenting of the visual display or the providing of the second audio output,
   wherein the visual components of the visual display presented by the visual display system are directly viewable in the second location from the visual display system during the presenting of the visual display at the first location, and
   wherein the second location is remote from the first location whereby the first audio output from the audio system is of a poorer quality at the second location than the first location, is lost prior to reaching the second location, or is delayed prior to reaching the second location causing loss of the synchronization with the visual display at the second location.

2. The method of claim 1, wherein the time synchronized audio program is played beginning at a time corresponding with a start time for the visual display at the first location.

3. The method of claim 1, wherein the audio program is synchronized to the visual components using the control signals used to trigger the visual components.

4. The method of claim 3, wherein the audio program is stored in memory on the client device prior to initiating the presenting of the visual display at the first location, is played back upon a receipt of a first one of the control signals, and is modified to correct for delays in receipt of one or more of the control signals to provide time synchronization with the presenting of the visual display at the first location.

5. The method of claim 1, wherein the audio program provided at the second location is substantially similar in content to the local audio output.

6. The method of claim 1, wherein the audio program differs in content from the local audio output and wherein the audio program content is selected from a set of soundtracks based on user input on the client device.

7. The method of claim 1, further comprising, prior to the providing of the audio program, determining a geographic location of the client device and performing the providing of the audio program only when the geographic location is determined to be in a set of predefined locations.

8. A method for synchronizing remote playback of a soundtrack associated with a live visual display, comprising:
on a mobile device, storing a soundtrack associated with a show comprising visual display components presented at a display location;
triggering operation of a sound system of the mobile device to play the stored soundtrack to synchronize components of the soundtrack with presenting the visual display components of the show at the display location without adding substantial delay after synchronization;
determining a geographic location of the mobile device; and
when the geographic location is outside a predefined set of locations, blocking the triggering of operation of the sound system to play the soundtrack on the mobile device,
wherein the playing of the soundtrack is initiated upon a determination that the time matches a predefined start time for the show or
wherein the method further comprises receiving a communication indicating a start control signal starting the show has been issued at the display location and, in response to the receiving, initiating the triggering operation on the mobile device.

9. The method of claim 8, further comprising downloading an application onto the mobile device for initiating the triggering and for synchronizing output of the components of the soundtrack with the visual display components.

10. The method of claim 8, wherein the playing of the soundtrack involves determining a delay in receipt of the start control signal and adjusting playing of the soundtrack to synchronize the components of the soundtrack with the visual display components.

11. The method of claim 8, wherein the soundtrack comprises content matching content of a soundtrack played on an audio system proximate to the display location concurrent with presentation of the show.

12. A display system, comprising:
a visual display system provided at a show site;
a local audio system provided at the show site;
a display control system operating to concurrently trigger operation of the visual display system and the local audio system to output, respectively, a visual display with a plurality of visual components and an audio output with audible components synchronized with the visual components; and
a remote audio system operating to play a soundtrack with audible components without added substantial delay being added after synchronization relative to the concurrently triggered operation of the visual display system and the local audio system, wherein the playing of the audible components are synchronized with the visual components of the visual display,
wherein the remote audio system is provided a location spaced apart at least 50 yards from the local audio system and
wherein the remote audio system initiates the playing of the soundtrack based upon a predefined start time for operating of the visual display system to provide the visual display at the show site or based upon a signal issued by the display control system to trigger the operation of the visual display system or the local audio system.

13. The display system of claim 12, wherein the audible components provided by the soundtrack match the audible components in the audio output provide by the local audio system.

14. The display system of claim 12, wherein the remote audio system comprises a wireless communication device, wherein the wireless communication device comprises memory storing the soundtrack, and wherein the remote audio system is operable to play the soundtrack only when the wireless communication device has a geographic location matching one of a set of predefined locations for synchronized use of the soundtrack with the visual display.

15. A method for presenting audio programming in synchronization with a visual event, comprising:
with a visual display system, presenting a visual display at a first location, wherein one or more visual components are triggered by control signals during the presenting;
in synchronization with the presenting of the visual display, providing first audio output from an audio system positioned at or proximate to the first location; and
concurrently with the presenting of the visual display, providing, with a client device at a second location, an audio program including second audio output that is time synchronized with the one or more visual components of the visual display,
wherein the second audio output and the one or more visual components of the visual display are time synchronized without substantially delaying being added after synchronization relative to the presenting of the visual display or the providing of the second audio output at any time during the method,
wherein the visual components of the visual display presented by the visual display system are viewable in the second location, without requiring use of a display screen at the second location, during the presenting of the visual display at the first location,
wherein the second location is remote from first location, and
wherein the audio program is stored in memory on the client device prior to beginning the presenting of the visual display at the first location.

16. The method of claim 15, wherein the audio program is synchronized to the visual components using the control signals used to trigger the visual components.

17. The method of claim 15, wherein the audio program is modified to correct for delays in receipt of one or more of the control signals to provide time synchronization with the presenting of the visual display at the first location.

18. The method of claim 15, wherein the audio program differs in content from the local audio output and wherein the audio program content is selected from a set of soundtracks based on user input on the client device.

* * * * *